United States Patent
Komulainen et al.

(10) Patent No.: US 6,767,431 B2
(45) Date of Patent: Jul. 27, 2004

(54) METHOD FOR MEASURING AND REGULATING CURL IN A PAPER OR BOARD WEB AND A PAPER OR BOARD MACHINE LINE

(75) Inventors: Antti Komulainen, Keuruu (FI); Kari Juppi, Palokka (FI)

(73) Assignee: Metso Paper, Inc., Helsinki (FI)

( * ) Notice: Subject to any disclaimer, the term of this patent is extended or adjusted under 35 U.S.C. 154(b) by 414 days.

(21) Appl. No.: 09/954,090

(22) Filed: Sep. 17, 2001

(65) Prior Publication Data

US 2002/0030319 A1 Mar. 14, 2002

Related U.S. Application Data

(63) Continuation of application No. PCT/FI00/00234, filed on Mar. 22, 2000.

(30) Foreign Application Priority Data

Mar. 23, 1999 (FI) .................................................. 990644

(51) Int. Cl.⁷ .......................... D21F 7/00; B65H 23/34; D21G 9/00; G01B 11/24
(52) U.S. Cl. ...................... 162/198; 162/197; 162/194; 162/260; 162/263; 162/271; 162/286
(58) Field of Search ................................ 162/198, 197, 162/194, 260, 263, 270, 271, 286, DIG. 6, DIG. 10; 34/114, 117, 116, 120, 122, 123, 446, 448; 83/51, 53, 177; 700/127–129

(56) References Cited

U.S. PATENT DOCUMENTS

| 3,658,642 | A |   | 4/1972  | Keyes, IV et al. |
|-----------|---|---|---------|------------------|
| 3,799,038 | A |   | 3/1974  | Bossons et al.   |
| 4,926,358 | A | * | 5/1990  | Tani et al. .................. 700/302 |
| 4,952,281 | A | * | 8/1990  | Akira ......................... 162/270 |
| 5,141,484 | A | * | 8/1992  | Akira ............................. 493/8 |
| 5,269,074 | A |   | 12/1993 | Sims et al.      |
| 5,416,980 | A |   | 5/1995  | Ilvespää         |
| 5,542,193 | A |   | 8/1996  | Sims et al.      |
| 5,557,860 | A |   | 9/1996  | Kotitschke et al.|
| 5,592,571 | A |   | 1/1997  | Peters           |
| 5,600,898 | A | * | 2/1997  | Deshpande et al. ........... 34/116 |
| 5,632,101 | A | * | 5/1997  | Oechsle ....................... 34/445 |
| 5,771,603 | A | * | 6/1998  | Kotitschke et al. ........... 34/446 |
| 5,884,415 | A | * | 3/1999  | Sims et al. ................... 34/117 |
| 5,983,523 | A |   | 11/1999 | Ijäs et al.      |
| 6,038,789 | A |   | 3/2000  | Kaihovirta et al.|

FOREIGN PATENT DOCUMENTS

| EP | 0 785 158 A2     |   | 7/1997 |           |
|----|------------------|---|--------|-----------|
| EP | 905574 A2        | * | 3/1999 | B05C/1/08 |
| FI | 91900            |   | 5/1994 |           |
| FI | 971301           |   | 3/1997 |           |
| FI | 972080           |   | 5/1997 |           |
| GB | 2343865 A        | * | 5/2000 | B32B/31/06|
| WO | WO 94/16290      |   | 7/1994 |           |
| WO | WO 00/56976      |   | 9/2000 |           |
| WO | WO 200161108 A1  | * | 8/2001 | B05D/1/02 |

* cited by examiner

Primary Examiner—José A. Fortuna
(74) Attorney, Agent, or Firm—Stiennon & Stiennon

(57) ABSTRACT

In the manufacture of a paper or board web (W), the web is slit or cut, the rising/lowering (H) of the edges of a slit/cut gap (C) formed at the slitting/cutting point or the width (L) of the gap is measured by means of a measurement device (21A; 21B; 21C), and the curl of the paper or board web (W) is regulated based on the result of measurement. A paper or board machine line has means for regulating curl in the web (W); means for slitting or cutting the paper or board web and for measuring the rising/lowering (H) of the edges of a slit/cut gap (C) formed at the slitting/cutting point or the width (L) of the slit/cut gap (C) in connection with the manufacture of the web (W) in order to regulate the curl of the web (W) based on the result of measurement.

25 Claims, 1 Drawing Sheet

METHOD FOR MEASURING AND REGULATING CURL IN A PAPER OR BOARD WEB AND A PAPER OR BOARD MACHINE LINE

CROSS REFERENCE TO RELATAED APPLICATIONS

This application is a continuation of PCT application No. PCT/FI00/00234, filed Mar. 22, 2000, and claims priority on Finnish Application No.990644, filed Mar. 23, 1999, the disclosure of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method for measuring and regulating curl in a paper or board web, in which method the curl of the paper or board web is regulated.

The invention also relates to a paper or board machine line which comprises sections for the manufacture of a paper or board web, which paper or board machine line comprises a means or means for regulating curl in the web.

It is known from experience that if paper is dried one-sidedly, the result is a tendency of curling of the sheet. When paper is dried, for example, by means of normal groups with single-wire draw from the side of its bottom face and if such asymmetric drying is extended over the entire length of the dryer section, the drying takes place so that first the bottom-face side of the paper web is dried and, when the drying makes progress, the drying effect is also extended to the side of the top face of the paper web. The thus dried paper usually curls and becomes concave, when viewed from above.

Reducing the tendency of curling of paper, in particular of fine paper, has become more and more important along with new printing and copying methods, in which methods the paper is heated suddenly, as a rule from one side, so that any internal strains that may have remained in the paper because of different reasons are discharged in the form of its curling. The tendency of paper to curl is affected both by the anisotropies in the different properties of the structure of the paper, such as fibre orientation, filler distribution, and density, and by anisotropies produced in the paper during drying, both in the direction of the plane of the paper and in the z-direction.

As known in the prior art, the tendency of curling of paper is already affected in connection with the forming of the web, in particular at the sheet formation stage by means of the selection of the difference in speed between the slice jet and the wire, and by means of the choice of the former and its mode of running, as well as by means of other running parameters. As known in the prior art, for example, in the case of copying paper, by means of unequal sidedness of drying in the after-dryer, a suitable initial curl form is regulated for the sheet in order that the curling of the paper after one-sided or double-sided copying might be optimized. In the case of copying paper, the reactivity of curling, i.e. the extent to which curling occurs per unit of change in moisture content, is affected to a greater extent by means of a multi-layer structure of the paper, which is produced in connection with the forming of the web in the wet end.

One factor that has a substantial effect on the curling of paper is then one-sided drying of the paper. In drying sections provided with the traditional twin-wire draw, the web can be dried at the same rate from both sides, and the uniformity of drying can be affected, and the tendency of paper to curl can be prevented, by regulating the steam pressures in the upper and lower cylinders. By means of the concept of a dryer section with single-wire draw, said drying at the same rate and said possibility of regulation cannot be accomplished. Attempts are made to prevent unequalsided drying, for example, by means of inverted drying groups, moistening and steam treatment of the web. For example, in connection with calendering, it is possible to employ steam spraying applied to the paper, the effect of which is based on relaxing the strains in the paper fibres by the effect of heat and moisture.

With respect to the prior art related to the invention in connection with regulation of curl and the methods used in it, reference may be made to FI patent 91900, FI patent applications 971301 and 972080 as well as to U.S. Pat. Nos. 5,269,074; 5,542,193; 5,557,860; and 5,592,571. These publications describe various arrangements and devices which are employed for regulation of paper curl. The principles described in said publications can naturally be also used for control of the curl profile in the cross machine direction. The publications also describe dryer sections known in the prior art in which control of curl is essential in order to achieve a good end product.

One problem in the prior art arrangements is that a method that is suitable for on-line measurement of curl is not known, which method has turned out to be an almost compelling need in modern paper manufacture. If curl could be measured on-line, it could also be regulated as quickly as possible as desired.

SUMMARY OF THE INVENTION

Thus, an object of the invention is to provide a method for measuring curl in a paper web, which method is suitable for use in connection with the manufacture of paper, i.e. on-line.

An object of the invention is also to provide a method which is suitable for use at several different locations in connection with a paper or board machine line.

A further object of the invention is to provide a paper or board machine line in which the curl of a web is measured on-line.

With a view to achieving the objectives stated above as well as those coming out later, the method according to the invention is mainly characterized in that, in the method, in connection with the manufacture of a paper or board web, the paper or board web is slit or cut, that the rising/lowering of the edges of a slit/cut gap formed at the slitting/cutting point or the width of the gap is measured by means of a measurement device, and that the curl of the paper or board web is regulated based on the result of measurement.

The paper or board machine line according to the invention is in turn mainly characterized in that the paper or board machine line comprises means for slitting or cutting a paper or board web and for measuring the rising/lowering of the edges of a slit/cut gap formed at the slitting/cutting point or the width of the slit/cut gap in connection with the manufacture of the web in order to regulate the curl of the web based on the result of measurement.

In accordance with the invention, the paper web is slit in its running direction over a suitable length and curl is determined based on the rising/lowering of the slit/cut edges or on the width of the slit/cut gap. The slit/cut edges rise/lower because of the tendency of paper to curl such that the result of measurement of the rising/lowering/width of the slit/cut gap is proportional to the intensity of curl. The necessary correlation may be determined based on laboratory measurements known in themselves. On the basis of on-line measurement, the factors affecting the curling of the paper web or one/some of them can be regulated in order to provide desired curl.

Suitable quick measurement, for example, laser measurement is used in the method according to the invention. The measurement device used is placed above or underneath a web at a location in a suitable way, so that the rising/lowering of the slitting point or of the slit/cut edges or the width of the slit/cut gap can be quickly measured. The measurement device may also be accomplished such that there is situated a light source/detector measurement device which is effective across the slit/cut gap, which device is quick and precise enough to determine the rising/lowering of the slit/cut edges or the width of the gap. Another measurement device known in itself, which can be advantageously utilized in the invention, is formed of a camera and image processing associated therewith.

In accordance with the invention, the curl of the paper web is regulated based on the result obtained from the measurement, for example, by regulating the steam pressure between upper/lower drying cylinders in dryer groups with twin-wire draw in a dryer section, by using a web moistening device or by regulating a device drying the web predominantly from one side. The methods and devices disclosed in the above-mentioned FI patent 91900, FI applications 971301 and 972080 as well as U.S. Pat. Nos. 5,269,074; 5,542,193; 5,557,860; and 5,592,571 can be applied in the invention.

in accordance with the invention, the measurement device is placed, in accordance with an advantageous embodiment example, on a paper machine at a location where the web is slit in any case, for example, in connection with a slitter-winder or the cutting of an edge strip. The invention naturally also encompasses arrangements in which devices are arranged at a desired measurement point, for example before a reel or a winder, for slitting the web at a desired point over a desired length. A slitter-winder and the point of cutting an edge strip are advantageous locations for placement because in that case there is no need for separate slitting/cutting devices and no extra paper broke is produced.

In accordance with the invention, the web may be slit or cut, for example, by a diagonal cutter, a separate slitter or cutter, a knife, or by using water jet cutting. After that, the slit/cut edges are examined by the measurement device which measures the rising/lowering of the edge or the width of the gap. After that, the regulation system is supplied with the measured value and data of the running conditions of the machine as well as with information, for example, based on laboratory results, on the relationship between the rising/lowering of the edges or the width of the gap and the actual curl. Based on the curl determined at the preceding stage, a desired curl regulation device or paper machine part/section is regulated in order to regulate the curl as desired, determining set values for curl regulation.

In accordance with the invention, it is also possible to establish a curl profile by slitting or cutting at several points or by passing the web almost diagonally with respect to the running direction of the web, whereby the curl profile may be measured over the entire width of the web and it may be regulated as desired by using devices/taking action that enable the web to be profiled in the width direction for the purpose of curl regulation.

When the method according to the invention is applied somewhere else but in connection with slitting-winding or cutting of an edge strip, the amount of broke produced is very small because the time required by the slitter/cutter and measurement devices advantageously used is, for example, about one second, in which connection 30 m of paper is manufactured at a speed of 1800 m/min.

The slitting of the web takes place, for example, by means of a blade or an equivalent slitter or cutter element or by means of a slitter-winder device or a device for cutting an edge strip, in which connection, when a blade or an equivalent cutter or slitter element is used, the slitting cutter device is struck quickly through the web, after which the edges of the slit web turn either upwards or downwards depending on the effect of curl. After that, the rising/lowering of the edge or the width of the slit/cut gap is measured by means of an optical measurement device, for example, utilizing a laser, in which connection the time taken by measurement is very short. The measurement device is placed either above or underneath the web or such as to measure across the web in the lateral direction, depending on the location in the paper or board machine line. Moreover, for instance, diagonal cutting devices in use today may be employed for slitting/cutting, in which connection there is no need for a separate slitter or cutter device.

The measurement location in the paper or board machine line may be, for example, after a dryer section, after a calender before a reel, between calenders or on a reeling or winding machine in connection with cutting of an edge strip.

When it is desired to measure the curl profile in the cross-machine direction from time to time, the cutting blade and the measurement device may be arranged to travel together across the web, for example, from the tending side to the driving side, thereby establishing the entire curl profile in the cross direction of the web.

When the invention is applied to a slitter-winder, the measurement device, for example, a laser measuring head can be arranged to be movable, so that it can be displaced from one slitting point to another, thereby enabling a rougher transverse profile of curl to be found out, depending on the number of the rolls to be slit. It is, of course, also possible to use several stationary measurement devices, for example, laser measurement devices.

BRIEF DESCRIPTION OF THE DRAWINGS

In the following, the invention will be described in more detail with reference to the figures in the accompanying drawing, to the details of which the invention is, however, not intended by any means to be narrowly confined.

DESCRIPTION OF THE PREFERRED EMBODIMENTS

Figure 1:
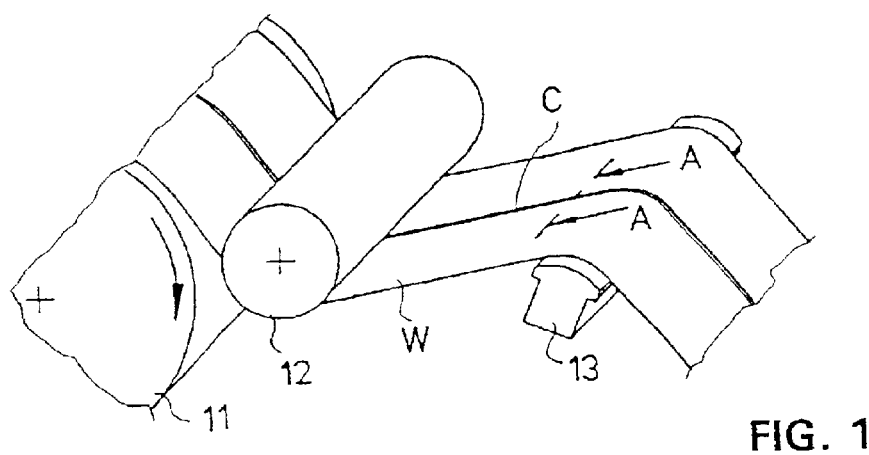
FIG. 1 schematically shows slitting of a web.

As shown in FIG. 1, a paper web W is passed on support of rolls 11,12 and a guide beam 13. A cut has been made in the paper web W at a point C by means of a blade, a slitter or cutter device, a water jet cutting device or equivalent.

Figure 2:
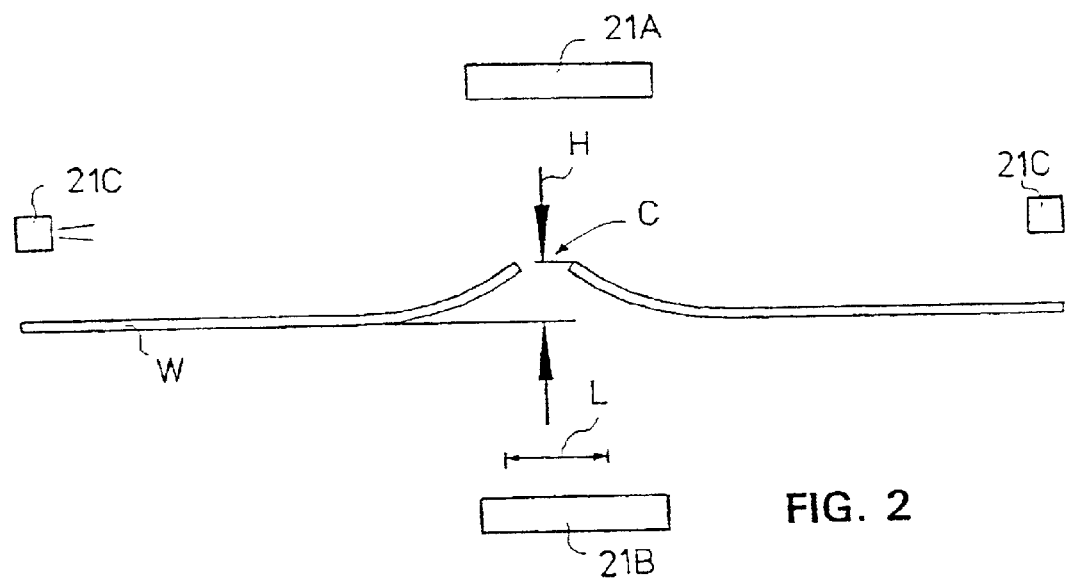
FIG. 2 is a schematic enlarged partial view of a section ACA in FIG. 1, i.e. the slitting point of the web.

FIG. 2 shows a schematic partial enlargement of FIG. 1 at a point ACA where at the slitting/cutting point C the slit/cut edges of the web are turned upwards because of the tendency of curling. FIG. 2 shows alternative locations for placement of a measurement device 21A; 21B; 21C for measuring the rising/lowering of the edges of the slitting/cutting point C or the width L of the slitting/cutting point. The measurement device 21A is placed above the web, the measurement device 21B is placed underneath the web, and the measurement device 21C is formed of a measurement device measuring in the cross direction of the web, for example, of a light source situated at one edge of the web and of a detector situated at the other edge thereof The measurement devices 21A; 21B shown in FIG. 2 may also be movable, for example, in the cross direction of the web, thus allowing the curl profile to be measured over the entire width of the web, or the measurement device may be placed, for example, in connection with a slitter-winder, in which case, depending on the number of web rolls, there is/are formed one or more slitting/cutting points C, in connection with each of which it is possible to place a measurement device 21A; 21B, or the measurement device 21A; 21B can be moved from one slitting/cutting point C to another.

Figure 3:
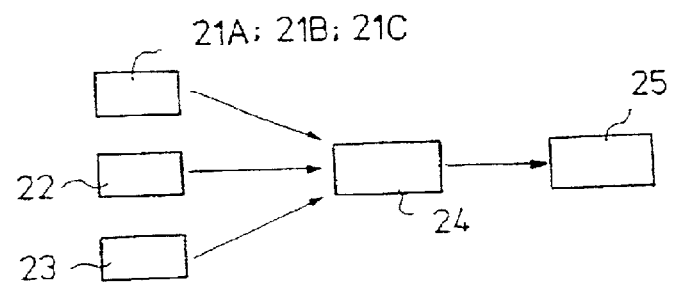
FIG. 3 is a schematic block diagram of a regulation arrangement used in connection with the system in accordance with the invention.

As shown in FIG. 3, data obtained from the measurement device 21A, 21B or 21C is passed to a regulation system 24. The regulation system 24 is also supplied with data of the running conditions of the machine from a data unit 22 as well as with results from a data unit 23 of the relationship between the curl and the rising/lowering of the edges of the web or the width of the gap determined, for example, based on laboratory measurements. The regulation unit 24 processes the measurement results based the data and passes an instruction further to a control unit 25 for regulating devices that affect the curl of the web in order to control the curl as desired.

Above, the invention has been described with reference to only one of its advantageous embodiments, to the details of which the invention is not intended by any means to be narrowly confined. Many variations and modifications are feasible within the inventive idea defined in the following claims.

We claim:

1. A method for measuring and regulating curl in a paper or board web, in which method the curl of the paper or board web is regulated, the method comprising, in connection with the manufacture of the paper or board web, the steps of:

slitting or cutting the paper or board web in a running direction of the paper or board web when the paper or board web is under tension in the direction of said running direction;

measuring, with a measurement device, the rising/lowering of the edges of a slit/cut gap formed at the slitting/cutting point or measuring the width of the gap; and regulating a device or devices that affect the curl of the paper or board web based on the result of measurement in order to control the curl of the web.

2. The method of claim 1 wherein the slitting or cutting step is in connection with a slitter winder.

3. The method of claim 1 wherein the slitting or cutting step is performed in connection with the cutting of an edge strip.

4. The method of claim 1 further comprising the steps of:

passing the measurement results in the measurement device to a regulation system;

processing the passed measurement results in the regulation system based on data of a data unit concerning the running conditions of the paper or board machine and on data supplied by a data unit concerning the relationship between the rising/lowering of the edges of the slit/cut gap or the width of the slit/cut gap and the actual curl of the web; and determining within the regulation system the desired set values for the regulation of curl and passing said act values into a control unit for curl regulation.

5. The method of claim 1 wherein the slitting or cutting step comprises slitting the web substantially diagonally with respect to the running direction of the web and wherein the rising/lowering of the edges of the cut/slit gap or the width of the cut/slit gap is measured in the cross direction of the web substantially over the entire slit/cut width in order to determine the transverse curl profile of the web.

6. The method of claim 1 wherein several longitudinal slits/cuts are made in the web and the measurement device is moved from one slitting/cutting point to another in order to determine curl at several points in the cross direction.

7. The method of claim 1 wherein several longitudinal slits/cuts are made in the web and a measurement device is placed at each slitting/cutting paint.

8. The method of claim 1 wherein the step of regulating a device or devices that affect the curl of the paper or board web comprises regulating the steam pressure between upper/lower drying cylinders in dryer groups with twin-wire draw in a dryer section.

9. The method of claim 1 wherein the step of regulating a device or devices that affect the curl of the paper or board web comprises using a web moistening device.

10. The method of claim 1 wherein the step of regulating a device or devices that affect the curl of the paper or board web comprises regulating a device drying the web predominantly from one side.

11. A paper or board machine line which comprises sections for the manufacture of a paper or board web, which paper or board machine line comprises a means for regulating curl in the web wherein the paper or board machine line comprises:

means for slitting or cutting the paper or board web in the running direction of the paper or board web when the paper or board web is under tension in the direction of said running direction, said means being positioned to engage the web and define a slit/cut gap; and means for measuring die rising/lowering of the edges of the slit/cut gap formed at the slitting/cutting point or of the width of the slit/cut gap in connection with the manufacture of the web in order to regulate the curl of the web based on the result of measurement, the means being positioned to detect said edges of the slit/cut gap.

12. The paper or board machine line of claim 11 wherein the means for measuring the rising/lowering of the edges of the slit/cut gap or the width of the slit/cut gap is placed in connection with a slitter-winder device.

13. The paper or board machine line of claim 11 wherein the measurement device or measuring the rising/lowering of the edges of the slit/cut gap or the width of the slit/cut gap is placed in connection with equipment for cutting an edge strip.

14. The paper or board machine line of claim 13 further comprising means for making several longitudinal slits/cuts in the web and a means for measuring is placed at each slitting/cutting point.

15. The paper or board machine line of claim 11 further comprising: a regulation system for processing the measurement data obtained from the means for measuring based on data of the running conditions provided by a data unit of the paper or board machine and on data supplied by a data unit of the machine concerning the relationship between the rising/lowering of the edges of the slit/cut gap or the width of the slit/cut gap and the actual curl; and a control unit for regulation of curl based on set values of curl regulation determined by the regulation system.

16. The paper or board machine line of claim 11 wherein the means for measuring is a laser-based measurement device.

17. The paper or board machine line of claim 11 wherein the means for measuring comprises a camera and image processing associated therewith.

18. The paper or board machine line of claim 11 wherein the paper or board machine line further comprises means for moving the means for slitting/cutting and the means for measuring substantially in the cross direction of the web in order to determine the transverse curl profile of the web.

19. The paper or board machine line of claim 11 further comprising means for making several longitudinal slits/cuts in the web and means for moving the means for measuring from one slitting/cutting point to another in order to determine the curl of the web at several points in the cross direction.

20. A papermaking machine with web curl regulation, the machine having a paper web which is under tension and which is advanced in a running direction, the machine comprising:

a cutting device for slitting or cutting the web in the running direction when the web is under tension in the running direction, to thereby form a gap between slit or cut portions of the web, the cutting device positioned to engage the web and make the slit or cut portions; and a measuring device positioned on the machine above or beneath the web to make a measurement of the gap formed by the cutting device; and a control device in communication with the pleasuring device, wherein the control device regulates the curl of the web based on said measurement.

21. The papermaking machine of claim 20 wherein the measuring device is laser-based.

22. The papermaking machine of claim 20 wherein the measuring device comprises a camera and image processing associated therewith.

23. The papermaking machine of claim 20 wherein the cutting device and the measuring device are movable substantially in the cross direction of the web in order to determine the transverse curl profile of the web.

24. The papermaking machine of claim 20 further comprising means for making several longitudinal slits/cuts in the web and means for moving the measuring device from one slitting/cutting point to another in order to determine the curl of the web at several points in the cross direction.

25. The papermaking machine of claim 20 further comprising means for making several longitudinal slits/cuts in the web and a measuring device is placed at each slitting/cutting point.

* * * * *

UNITED STATES PATENT AND TRADEMARK OFFICE
CERTIFICATE OF CORRECTION

PATENT NO. : 6,767,431 B2
DATED : July 27, 2004
INVENTOR(S) : Antti Komulainen et al.

It is certified that error appears in the above-identified patent and that said Letters Patent is hereby corrected as shown below:

Column 6,
Line 5, "act" should be -- set --.

Column 6,
Line 20, "paint" should be -- point --.

Column 8,
Line 6, "pleasuring" should be -- measuring --.

Signed and Sealed this

Sixteenth Day of November, 2004

JON W. DUDAS
*Director of the United States Patent and Trademark Office*